UNITED STATES PATENT OFFICE.

THOMAS GRIFFITHS, OF LIVERPOOL, COUNTY OF LANCASTER, ENGLAND.

WHITE-ZINC PIGMENT AND MODE OF MANUFACTURING THE SAME.

SPECIFICATION forming part of Letters Patent No. 238,680, dated March 8, 1881.

Application filed July 14, 1880. (No specimens.) Patented in England October 18, 1878.

*To all whom it may concern:*

Be it known that I, THOMAS GRIFFITHS, of Liverpool, in the county of Lancaster and Kingdom of England, paint manufacturer, have invented certain new and useful Improvements in White Pigment and Mode of Manufacturing the same, (for part of which I have received Letters Patent in England, No. 3,864, dated October 18, 1878;) and I do hereby declare that the following is a full, clear, and exact description of the invention, which will enable others skilled in the art to which it appertains to make and use the same.

In the manufacture of pigment from mixed zinc and barium salts it has been the practice hitherto to doubly or separately precipitate them in the form of hydrated sulphide of zinc and sulphate of barium. These precipitates were then roasted or calcined till nearly all the sulphur was oxidized and driven off, leaving oxide of zinc, with a small quantity of sulphide in place of the original hydrated sulphide of zinc. This plan of calcination burns off, not merely the water of the hydrated sulphide of zinc and the injurious uncombined sulphur, but a great part of the combined sulphur as well, lessening the weight and bulk and injuring the quality till the pigment is little superior to the uncalcined original mixture of sulphide of zinc, free sulphur, and sulphate of barium, or to a mixture of ordinary oxide of zinc and sulphate of baryta.

Now, the object of long and costly experiment on my part has been, first, to find a plan by which I can eliminate from the hydrated sulphide of zinc the uncombined or easily-separated sulphur, which precipitates with the sulphide without driving off the chemically-combined sulphur; second, to prevent the variability of result occasioned by unequal heating of the mass and the damaged color and loss of covering power caused when the heating has not been accurately conducted. These results I have obtained in the following manner: I precipitate a solution of sulphate of zinc, or of chloride of zinc, or of mixtures of both, or an alkaline solution of oxide of zinc with a solution of barium sulphide or a soluble sulphide or polysulphide of sodium, potassium, hydrogen, or even calcium or ammonium, until all the zinc in solution is precipitated. The precipitates consist of hydrated sulphide of zinc, or of a mixture of hydrated sulphide of zinc and barium or calcium sulphate. They are collected on a filter, or by means of filter-presses, and are treated in the following manner, in order to obtain an improved pigment therefrom. I mix these precipitates with a quantity of common salt, either dry or in solution, and dry this mixture in a drying-room. (In working on a large scale I find that the addition of about ten to fifteen per cent. of salt gives good results.) The dried mixture of precipitate and salt is now heated to red heat in a muffle-furnace or in retorts without contact of air. The salt acts in the furnace as a frit or flux, and the pigment can safely be heated to a higher heat without being spoiled in color, while at the same time the density of the product is by this means greatly improved, and the pigment has far more body or covering power.

Instead of common salt I can use other salts of approximately the same fusibility, and which do not act decomposingly on the sulphide of zinc—for instance, chloride of barium or of calcium; but I prefer common salt because it is the cheapest.

When the mixture in the furnace has been heated to a red heat it is drawn from the muffle, ground in water, or levigated, well washed with water to remove all the soluble salts, pressed, and dried in the usual way.

In order to improve the softness of the pigment, and also the adhesiveness of the pigment when used as an oil-paint, I generally mix the wet pigment (after it has been drawn from the muffle) with a small quantity of magnesia, carbonate of magnesia, or carbonate of lime, as described in specification No. 212,016.

The exact process of manufacturing my pigment, and the quantities and ingredients, may be largely varied, as has already been shown. The following is therefore given, not as the only process for manufacturing my pigment, but as a very convenient one, giving good results.

A saturated solution of sixty-eight parts of zinc chloride ($ZnCl_2$) in water is precipitated by a saturated solution of eighty-four and a half parts of barium sulphide ($BaS$) in water. To the mixture is immediately added a saturated solution of seventy-one parts of sodium sulphate, ($NA_2SO_4$,) and the whole is well stirred. The resulting precipitate contains zinc sulphide (ZnS) and barium sulphate, ($BaSO_4$.) It is pressed to extract the surplus water, and well mixed with one-tenth of its weight of common salt, and sometimes one-thirtieth of its weight of carbonate of magnesia, though this is not a necessity. It is then placed loosely in a retort, the cover luted on, a small pipe being the only communication with the interior of the retort. It is now subjected to a low heat till the water is expelled, and with it the air, a valve in the pipe preventing the entrance of fresh air in case of a partial vacuum. The heat is then raised till the contents become heated to a bright cherry-red, when they can either be discharged at once into water, or, better, if time be no object, allowed to cool, and then well washed to remove the sodium chloride. They are then ground, pressed, and dried, and packed for market.

Having fully described my invention, what I desire to claim and secure by Letters Patent is—

1. The process of making a pigment from materials, such as mixed zinc and barium salts, containing artificially-precipitated sulphide of zinc by heating the same, mixed with common salt, to a bright-red heat and afterward dissolving out the salt.

2. In the process of making a pigment from zinc sulphide, calcining barium sulphate by heating the same, mixed with common salt, to such a temperature that the common salt shall be partially or wholly fused, and afterward dissolving out the common salt.

3. The combined process of manufacturing pigment from precipitated sulphide of zinc by mixing it with common salt and calcining it to a heat sufficient to frit or fuse the common salt without contact of air, washing the calcined mass so as to remove the common salt, and grinding and levigating in the usual way.

4. As a new article of manufacture, the compound consisting of an intimate mixture of calcined barium sulphate and anhydrous zinc sulphide free from uncombined sulphur and unoxidized by contact with air during calcination, substantially as set forth.

THOMAS GRIFFITHS.

Witnesses:
WM. P. THOMPSON,
JOHN D. O'BRIEN.